United States Patent [19]

Kawase et al.

[11] 4,066,624

[45] Jan. 3, 1978

[54] POLYESTERS OF NAPHTHALENE CARBOXYLIC ACIDS AND HYDROXY ALKOXYDIPHENYL SULFONES

[75] Inventors: Shoji Kawase; Takatoshi Kuratsuji; Hiroo Inata; Kazuyoshi Suzuki; Takeo Shima, all of Iwakuni, Japan

[73] Assignee: Teijin Limited, Osaka, Japan

[21] Appl. No.: 542,793

[22] Filed: Jan. 21, 1975

[30] Foreign Application Priority Data

Jan. 25, 1974 Japan .................................. 49-10078

[51] Int. Cl.$^2$ ...................... C08G 63/18; C08G 63/66; C08G 63/68
[52] U.S. Cl. ........................................ 260/49; 264/328
[58] Field of Search ................................ 260/47 C, 49

[56] References Cited

U.S. PATENT DOCUMENTS

| | | | |
|---|---|---|---|
| 3,558,557 | 1/1971 | Hrach et al. | 260/47 |
| 3,865,789 | 2/1975 | Wyhof et al. | 260/47 C |
| 3,935,166 | 1/1976 | Kanai et al. | 260/47 C |

*Primary Examiner*—Lester L. Lee
*Attorney, Agent, or Firm*—Sherman & Shalloway

[57] ABSTRACT

A process for preparing polyesters, which comprises reacting (A) a difunctional carboxylic acid component containing at least 50 mol% of a naphthalene dicarboxylic acid and/or its ester-forming derivative, (B) a diol component containing an aromatic group and at least 50 mol% of a 4,4'-bis-(ω-hydroxyalkoxy)diphenylsulfone and (C) an aliphatic or alicyclic diol component, the molar ratio of component (B) to component (A) being 0.05–1, and the molar ratio of the sum of components (B) and (C) to component (A) being 1.1–3.0; and then polymerizing the resulting reaction product in the presence of a catalyst while distilling off the excess of the component (C) out of the reaction system, thereby to form a polymer having a reduced viscosity of at least 0.5.

8 Claims, No Drawings

POLYESTERS OF NAPHTHALENE CARBOXYLIC ACIDS AND HYDROXY ALKOXYDIPHENYL SULFONES

This invention relates to an improved process for preparing polyesters, especially naphthalene dicarboxylate polyesters.

Polyethylene terephthalate has been widely used commercially because of its superior mechanical properties and chemical resistance, but has the defect that it has poor dimensional stability and transparency because of its relatively low second order transition point, high degree of crystallinity, and high speed of crystallization.

On the other hand, polyethylene-2,6-naphthalate resulting from the replacement of all acid component of the polyethylene terephthalate by naphthalene-2,6-dicarboxylic acid has superior mechanical properties and chemical resistance to the same extent as the polyethylene terephthalate, and fairly good transparency owing to its high second order transition point, and slower speeds of crystallization and higher temperatures at which the speed of crystallization is maximum, than the polyethylene terephthalate. However, in order to impart sufficient thermal stability to the polyethylene-2,6-naphthalate, it must be molecularly oriented by rolling or drawing, and therefore, the operation becomes complicated.

Accordingly, it is an object of this invention to provide a process for preparing naphthalenedicarboxylate polyesters having high thermal stability as well as superior mechanical properties, chemical resistance and transparency.

Our investigations led to the discovery that the above object can be achieved by reacting a naphthalenedicarboxylic acid with a 4,4'-bis-(ω-hydroxyalkoxy)diphenylsulfone and an aliphatic or alicyclic diol in specific ratios.

According to this invention, there is provided a process for preparing polyesters, which comprises reacting (A) a difunctional carboxylic acid component containing at least 50 mol% of a naphthalenedicarboxylic acid and/or its ester-forming derivative, (B) a diol component containing an aromatic group and at least 50 mol% of said diol component being a 4,4'-bis-(ω-hydroxyalkoxy)diphenylsulfone of the general formula

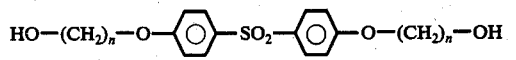

(I)

wherein n is an integer of 2 to 6, and (C) a diol component of the general formula

HO—R—OH    (II)

wherein R is an aliphatic or alicyclic hydrocarbon group containing 2 to 12 carbon atoms,
the molar ratio of component (B) to component (A) being 0.05–1, and the molar ratio of the sum of components (B) and (C) to component (A) being 1.1–3.0; and then polymerizing the resulting reaction product in the presence of a catalyst while distilling off the excess of the component (C) out of the reaction system, thereby to form a polymer having a reduced viscosity, as measured on an o-chlorophenol solution in a concentration of 1.2 g/dl at 35° C., of at least 0.5.

The difunctional carboxylic acid component (A) used in this invention consists mainly of a naphthalenedicarboxylic acid. Naphthalene-2,6-dicarboxylic acid, naphthalene-2,7-dicarboxylic acid and naphthalene-1,5-dicarboxylic acid are especially preferred. The naphthalenedicarboxylic acids may be used alone or in combination of two or more.

Together with the naphthalenedicarboxylic acid, a minor proportion of another dicarboxylic acid may be used. Examples of the other dicarboxylic acids are aromatic group-containing dicarboxylic acids such as terephthalic acid, isophthalic acid, 2-methylterephthalic acid, 4-methylisophthalic acid, diphenyldicarboxylic acid, diphenylsulfonedicarboxylic acid, or diphenoxyethanedicarboxylic acid, aliphatic dicarboxylic acids such as sebacic acid, and hydroxy acids such as p-β-hydroxyethoxybenzoic acid. The proportion of the other dicarboxylic acid and/or hydroxy acid is up to 50 mol%, preferably up to 30 mol%, and more preferably up to 10 mol%, based on component (A).

Instead of the carboxylic acid used as component (A), its ester-forming derivative can also be used. Examples of the ester-forming derivative are lower alkyl esters (e.g., methyl, ethyl, propyl, or butyl) and aryl esters (e.g., phenyl) of the above-illustrated carboxylic acids.

Component (B) use in the process of this invention is a 4,4'-bis-(ω-hydroxyalkoxy)diphenylsulfone of general formula (I), preferably 4,4'-bis-(β-hydroxyethoxy)-diphenylsulfone. The proportion of component (B) to be charged is 5 to 100 mol% based on component (A). The especially preferred proportion is 5 to 95 mol%. If the amount of component (B) is less than 5 mol%, the resulting polymer crystallizes at the time of shaping or heat-treatment, and its transparency is worsened. On the other hand, if it exceeds 100 mol%, the degree of polymerization of the resulting polyester is not sufficiently high. Thus, the proportions outside the range specified above are not preferred.

As a part of the component (B), a minor amount of a bis-(ω-hydroxyalkoxy) diphenylsulfone (e.g., 2,4'-isomer, 2,2'-isomer), which is an isomer of the 4,4'-bis-(ω-hydroxyalkoxy) diphenylsulfone, or a diol expressed by the following general formula

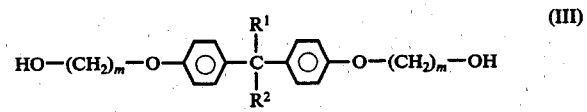

(III)

wherein m is an integer of 2 to 6; and R¹ and R² are organic groups containing 1 to 6 carbon atoms (e.g., an alkyl group), and they may be the same or different, or they may be linked together to form a divalent group, such as 2,2-bis-(4-β-hydroxyethoxyphenyl) propane or 1,1-bis-(4-β-hydroxyethoxyphenyl) cyclohexane can be used. The amount of this minor component is up to 50 mol%, preferably up to 40 mol%, based on the component (B). In this case, therefore, the component (B) consists of (a) the 4,4'-bis-(ω-hydroxyalkoxy) diphenylsulfone, (b) bis-(ω-hydroxyalkoxy) diphenylsulfones other than the 4,4'-isomer, and (c) the diol of general formula (III). These components (a), (b) and (c) are used such that the proportion of the sum of compounds (a), (b) and (c) is 5 to 100 mol% based on the component (A), and the molar ratio of compound (a) to the sum of compounds (a), (b) and (c) is at least 0.50, preferably at least 0.60.

In the process of this invention, the diol of general formula (II) is used as component (C). Examples of this diol are ethylene glycol, propylene glycol, trimethylene glycol, neopentylene glycol, hexamethylene glycol, and cyclohexane dimethylol. These diols are used either alone or in combination of two or more. The use of ethylene glycol or neopentylene glycol is especially preferred.

The proportion of component (C) to be charged is such that the total proportion of components (B) and (C) is 110 to 300 mol%, preferably 150 to 250 mol%, based on component (A). If the total proportion of the components (B) and (C) is less than 110 mol%, the rate of polymerization becomes slow, and the degree of polymerization of the resulting polyester is not sufficiently high. Even if the total proportion is more than 300 mol%, it only results in the wasteful use of the component (B) or (C) in the reaction.

One novel aspect of this invention is that the 4,4'-bis-(ω-hydroxyalkoxy) diphenylsulfone of formula (I) (component B) and the aliphatic or alicyclic diol of formula (II) (component C) as a diol component for forming polyesters are conjointly used together with the naphthalenedicarboxylic acid and/or its ester-forming derivative (component A).

The 4,4'-bis-(ω-hydroxyalkoxy) diphenylsulfone retards the crystallization of polyesters, and serves to give naphthalate polyesters having good transparency and excellent thermal stability. But when used alone, it cannot give polyesters of sufficiently high degrees of polymerization. In order to prepare polyesters having sufficiently high degreees of polymerization, the aliphatic or alicyclic diol of formula (III) must be conjointly used as the diol component.

In the preparation of the above polymers, any method generally known to produce polyesters can be employed. For example, the following methods can be used.

1. A method which comprises esterifying the carboxylic acid consisting mainly of the naphthalenedicarboxylic acid, and components (B) and (C) to form a bis-diol ester and/or its oligomer, and then polycondensing the bis-diol ester and/or its oligomer.
2. A method which comprises subjecting an ester (for example, a dimethyl or diphenyl ester) of the carboxylic acid consisting mainly of the naphthalenedicarboxylic acid and the components (B) and (C) to an ester-interchange reaction to form a bis-diol ester and/or its oligomer, and then polycondensing the bis-diol ester and/or its oligomer.

In the polycondensation, the excess of component (C) is distilled off out of the reaction system, but a substantial amount of the 4,4'-bis-(ω-hydroxyalkoxy) diphenylsulfone as component (B) does not distill off, but contributes to the formation of the molecular chain of polyester.

Needless to say, additives such as catalysts, stabilizers or coloring agents, generally used for preparing polyesters, can also be used in the preparation of naphthalenecarboxylate polyesters in accordance with the process of this invention.

The polyesters obtained by the process of this invention have high second order transition points, and superior dimensional stability, transparency, thermal stability and chemical resistance, and find utility for preparation of films and various shaped articles.

The following Examples and Comparative Examples illustrate the present invention in greater detail, but do not limit it.

The properties of the polyesters obtained in these examples were measured by the following methods.

1. Reduced Viscosity ($\eta_{sp/c}$)

Measured in o-chlorophenol at 35° C. with C=1.2 (g/dl).

2. Softening Point

Measured by using a Vicat softening point measuring device.

3. Second order transition point

Measured using a differential thermal analyzer (Perkin-Elmer DSC-1 type) at a temperature elevation rate of 10° C./min.

4. Heat distortion temperature

Measured in accordance with ASTM D-648.

5. Chemical resistance

The sample is immersed for a prescribed period of time in boiling water, or acetone or benzene at room temperature, and changes in its appearance are observed visually.

EXAMPLES 1 TO 4 AND COMPARATIVE EXAMPLES 1 AND 2

A flask equipped with a rectifying column was charged with 61.0 parts of dimethyl naphthalene-2,6-dicarboxylate and prescribed amounts (as indicated in Table 1) of 4,4'-bis-(β-hydroxyethoxy)diphenylsulfone and ethylene glycol together with 0.044 part of calcium acetate and 0.022 part of antimony trioxide. They were reacted at 180° C. with the temperature gradually elevated up to 250° C. Methanol formed as a result of the reaction was distilled off out of the reaction system.

After the distillation of the methanol stopped, the reaction product was transferred to a three-necked flask equipped with a stirrer. Phosphorous acid (0.021 part) was added, and the mixture was stirred for 15 minutes at 280° C. under atmospheric pressure. The pressure of the reaction system was gradually reduced down to 0.5 mmHg (absolute) over the course of about 15 minutes. The reaction was contained for another 3 hours to afford polymers having reduced viscosities, softening points and second order transition points as shown in Table 1.

The resulting polymers were injection molded into disc-like articles (diameter 2 inches, thickness 0.1 inch) and pillar-like articles (length ¼ inch, width ½ inch, height 5 inches) at an injecting temperature of 290° C. with the temperature of the mold held at 60° C. The appearances of the resulting molded articles, changes in appearance that occurred when treating the disc-like articles with boiling water, acetone at room temperature, or benzene at room temperature for 2 hours, and the heat distortion temperatures of the molded articles were determined and the results are shown in Table 1.

Comparative Example 1 was an example in which the 4,4'-bis-(β-hydroxyethoxy)diphenylsulfone was use in a smaller amount than in the above Example. Comparative Example 2 was an example in which an equimolar amount (i.e. 48.5 parts) of dimethyl terephthalate was used instead of the 2,6-naphthalenedicarboxylic acid in Example 1. Otherwise, these Comparative Examples were carried out in the same way as in Example 1.

Table 1

| | | Examples | | | | Comparative Examples | |
|---|---|---|---|---|---|---|---|
| | | 1 | 2 | 3 | 4 | 1 | 2 |
| Amounts of starting materials | 4,4'-bis-(β-hydroxyethoxy) diphenylsulfone (parts) | 8.5 | 42.3 | 59.2 | 67.6 | 0.8 | 8.5 |
| | Ethylene glycol (parts) | 31.0 | 24.0 | 19.5 | 19.5 | 31.0 | 31.0 |
| Properties of polymers | $\eta_{sp/c}$ | 0.91 | 0.89 | 0.82 | 0.77 | 0.90 | 0.88 |
| | Softening point (° C.) | 179 | 185 | 188 | 188 | 270 | 227 |
| | Second order transition point (° C.) | 121 | 136 | 140 | 143 | 115 | 77 |
| | Appearance | Transparent | " | " | " | Gate portion whitened | Transparent |
| Molded articles | Heat distortion temperature (° C.) | 106 | 123 | 131 | 134 | 102 | 81 |
| | Chemical resistance to Boiling water | No change | " | " | " | " | Whitened, and shrunken |
| | Acetone | No change | " | " | " | " | Cloudy |
| | Benzene | No change | " | " | " | " | Cloudy |

EXAMPLE 5

A three-necked flask equipped with a stirrer was charged with 61.0 parts of dimethyl naphthalene-2,7-dicarboxylic acid, 50.7 parts of 4,4'-bis-(β-hydroxyethoxy) diphenylsulfone, 39.0 parts of neopentylene glycol and 0.017 part of titanium tetrabutoxide, and they were reacted at 180° C. while gradually elevating the temperature up to 250° C. Methanol formed was distilled off out of the system.

The temperature was gradually elevated up to 280° C. over the course of about 15 minutes. While this temperature was maintained, the pressure of the reaction system was gradually reduced to 0.5 mmHg (absolute) over the course of about 15 minutes. The reaction was continued for another 3 hours to afford a polymer having an ($\eta_{sp/c}$) of 0.73, a softening point of 172° C. and a second order transition point of 131° C.

The polymer was melt-extruded at 300° C. to form a film having a thickness of about 150 microns. It was treated for 1 hour in boiling water, but was still transparent and soft. No change in appearance was observed.

EXAMPLE 6

A flask equipped with a rectifying column was charged with 61.0 parts of dimethyl naphthalene-2,6-dicarboxylate, 21.2 parts of 4,4'-bis-(β-hydroxyethoxy) diphenylsulfone, 27.9 parts of ethylene glycol, 0.044 part of calcium acetate and 0.013 part of germanium dioxide, and they were reacted in the same way as in Example 1 to form a polymer having an ($\eta_{sp/c}$) of 0.91, a softening point of 180° C. and a second order transition point of 123° C.

The polymer was injection molded in the same way as in Examples 1 to 4, and the properties of the molded article were determined. The results are shown in Table 2.

Table 2

| Appearance | Transparent |
|---|---|
| Heat distortion temperature | 110° C. |
| Resistance to boiling water | No change |
| acetone | No change |
| benzene | No change |

Note:
In the chemical resistance test, the sample was treated for 2 hours in all cases.

COMPARATIVE EXAMPLE 3

Example 2 was repeated except that 39.5 parts of 2,2-bis-(4-β-hydroxyethoxyphenyl) propane was used instead of 42.3 parts of 4,4'-bis-(β-hydroxyethoxy)-diphenylsulfone. The resulting polymer had an ($\eta_{sp/c}$) of 0.92 and a softening point of 159° C. The polymer was injection molded into disc-like and pillar-like articles in the same way as in Example 2 except that the injecting temperature was changed to 270° C. The molded articles had a heat distortion temperature of as low as 94° C., and when treated for 2 hours in boiling water, they shrunk.

EXAMPLE 7

An autoclave equipped with a rectifying column was charged with 54.0 parts of naphthalene 2,6-dicarboxylic acid, 25.4 parts of 4,4'-bis-(β-hydroxyethoxy)diphenyl-sulfone, 43.2 parts of 1,4-cyclohexane dimethylol, and 0.026 part of titanium tetrabutoxide, and they were reacted at 260° to 270° C. Water formed as a result of the reaction was distilled off out of the system during the reaction. After almost a theoretical amount of water distilled off, the reaction product was transferred to a three-necked flask equipped with a stirrer, and reacted for 30 minutes at 280° C. under atmospheric pressure. Then, the pressure of the reaction system was gradually reduced down to about 0.5 mmHg (absolute) in the course of 15 minutes. The reaction was continued for another 3 hours. The polymer obtained had an ($\eta_{sp/c}$) of 0.74 and a softening point of 183° C.

The polymer was injection molded in the same way as in Examples 1 to 4, and the properties of the resulting molded article were determined. The results are shown in Table 3 below.

Table 3

| Appearance | Transparent |
|---|---|
| Heat distortion temperature | 115° C. |
| Resistance to boiling water (2 hours) | No change |
| acetone (2 hours) | No change |
| benzene (2 hours) | No change |

EXAMPLE 8

A flask equipped with a rectifying column was charged with 48.8 parts of dimethyl naphthalene-2,6-dicarboxylate, 9.7 parts of dimethyl terephthalate, 50.7 parts of 4,4'-bis-(β-hydroxyethoxy) diphenyl sulfone, 26.0 parts of neopentylene glycol, 0.044 part of calcium acetate and 0.022 part of antimony trioxide, and they were reacted at 180° to 250° C. Methanol formed as a result of the reaction was distilled off out of the reaction system. The reaction product was then transferred to a flask equipped with a stirrer, and 0.035 part of trimethyl phosphate was added. The mixture was reacted at 280° C. under atmospheric pressure for 30 minutes, and then the reaction system was gradually reduced down to about 0.5 mmHg in the course of 15 minutes. The reaction was carried out for another 3 hours to afford a polymer having an ($\eta_{sp/c}$) of 0.82 and a softening point of 181° C.

The polymer was injection molded in the same way as in Examples 1 to 4, and the properties of the molded article were determined. The results are shown in Table 4 below.

Table 4

| Appearance | Transparent |
|---|---|
| Heat distortion temperature (° C.) | 127° C. |
| Resistance to boiling water (2 hours) | No change |
| acetone (2 hours) | No change |
| benzene (2 hours) | No change |

What we claim is:

1. Polyesters having a reduced viscosity, as measured on an o-chlorophenol solution in a concentration of 1.2 g/dl at 35° C. of at least 0.5 which comprises (A) a difunctional carboxylic acid component containing at least 50 mol% of a naphthalene dicarboxylic acid and-/or its lower alkyl ester or aryl ester, (B) a diol component containing an aromatic group and at least 50 mol% of said diol component being a 4,4'-bis-(ω-hydroxyalkoxy)diphenylsulfone of the general formula

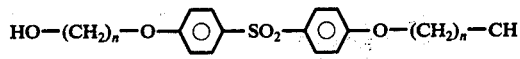

wherein n is an integer of 2 to 6, and (C) is a diol component of the general formula

wherein R is an aliphatic or alicyclic hydrocarbon group containing 2 to 12 carbon atoms, said polyester obtained by heat polymerizing, while distilling off the excessive of the component (C) out of the reaction system at a molar ratio of component (B) to component (A) of 0.05–1:1 and a molar ratio of the sum of components (B) and (C) to component (A) of 1.1–3.0:1.

2. The polyesters of claim 1 wherein the molar ratio of component (B) to component (A) is from 0.5–1:1.

3. The polyesters of claim 2 wherein 100 mol% of component (B) is 4,4'-bis-(ω-hydroxyalkoxy)diphenylsulfone.

4. The polyesters of claim 1 wherein said component (C) is ethylene glycol or neopentylene glycol.

5. The polyesters of claim 1 wherein said naphthalene dicarboxylic acid is at least one member selected from the group consisting of: naphthalene-2,6-dicarboxylic acid, naphthalene-2,7-dicarboxylic acid and naphthalene-1,5-dicarboxylic acid.

6. The polyesters of claim 1 wherein up to 40 mol% of component (B) is at least one diol containing an aromatic group selected from 2,4'-bis-(ω-hydroxyalkoxy) diphenylsulfone, 2,2'-bis-(ω-hydroxyalkoxy) diphenylsulfone and a diol expressed by the following formula (III)

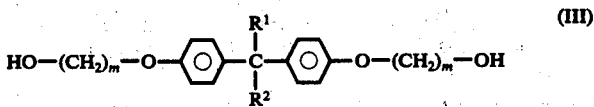

wherein m is an integer of 2 of 6; and $R^1$ and $R^2$ are organic groups containing 1 to 6 carbon atoms and they may be the same or different, or they may be linked together to form a cyclohexane group.

7. The polyesters of claim 3 wherein said 4,4'-bis-(ω-hydroxyalkoxy) diphenylsulfone is 4,4'-bis-(β-hydroxy ethoxy) diphenylsulfone.

8. The polyesters of claim 6 wherein said 4,4'-bis-(ω-hydroxyalkoxy) diphenylsulfone is 4,4'-bis-(β-hydroxy ethoxy) diphenylsulfone.

* * * * *